United States Patent [19]

Wang et al.

[11] 3,941,633

[45] Mar. 2, 1976

[54] PLASTIC LAMINATE, ARTICLE AND METHOD OF MAKING SAME

[75] Inventors: Tsu-Huai Wang, Hockessin, Del.; Edgar T. Key, West Chester, Pa.

[73] Assignee: Seton Company, Newark, N.J.

[22] Filed: Mar. 27, 1974

[21] Appl. No.: 455,472

[52] U.S. Cl. ............... 156/77; 156/222; 156/224; 156/243; 156/246; 428/311; 428/315; 428/321; 428/424; 428/425; 428/904
[51] Int. Cl.² .................... B32B 5/18; B32B 31/14
[58] Field of Search ....... 156/77, 78, 222, 224, 243, 156/246; 161/159; 428/311, 315, 321, 424, 425, 904

[56] References Cited
UNITED STATES PATENTS

| | | | |
|---|---|---|---|
| 3,607,593 | 9/1971 | Semenzato | 161/159 |
| 3,794,548 | 2/1974 | Wirth et al. | 161/159 |

*Primary Examiner*—William J. Van Balen

[57] ABSTRACT

A plastic laminate and shaped article having a polyurethane film substrate, a fabric superstrate and an intermediate layer of polyurethane foam. The polyurethane foam layer is cast upon the polyurethane film to provide a substantially integral laminate. The fabric layer is also bonded to the foam layer, preferably prior to complete curing, permitting the use of unnapped fabrics.

6 Claims, 4 Drawing Figures

U.S. Patent   March 2, 1976   3,941,633
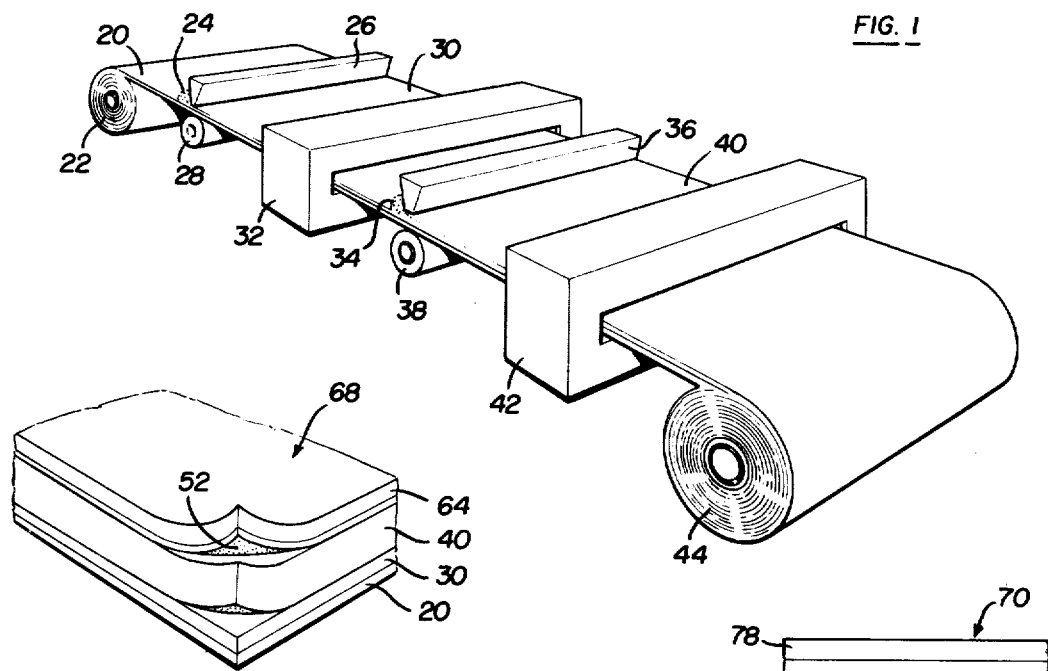
FIG. 1
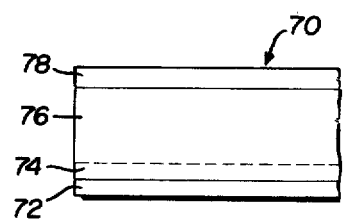
FIG. 4
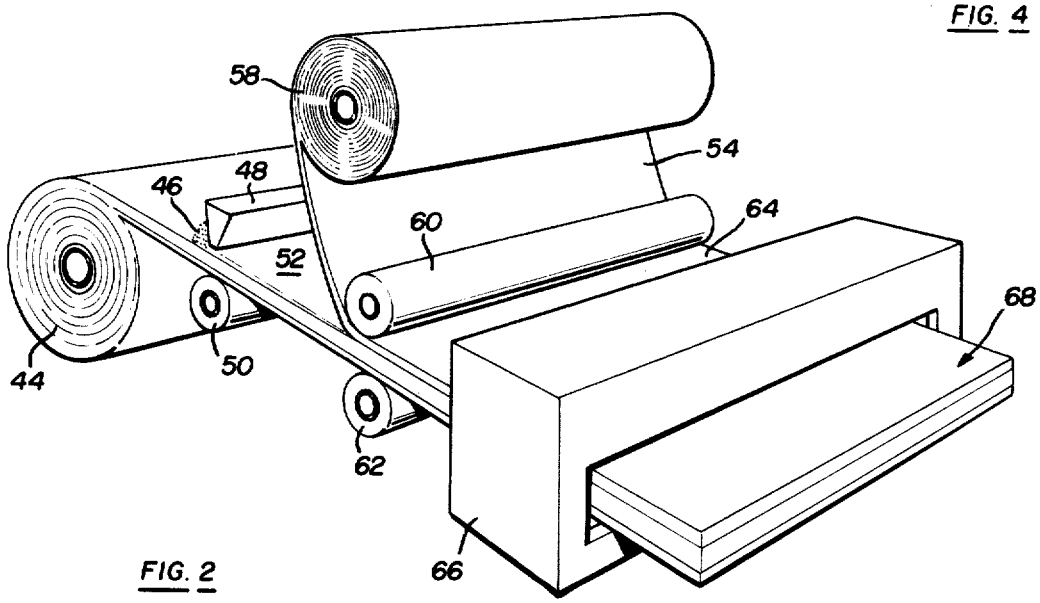
FIG. 3
FIG. 2

PLASTIC LAMINATE, ARTICLE AND METHOD OF MAKING SAME

FIELD OF THE INVENTION

An improved plastic laminate and method of making a laminate particularly suitable for shaped articles subject to repeated flexure and wear, such as shoe uppers, furniture coverings and the like. More particularly, the disclosed invention relates to laminates having an intermediate foam layer, preferably polyurethane foam.

The prior art includes a number of polyurethane foam laminates and systems, wherein the foam is utilized as a backing or resilient cushion layer. For example, British Pat. No. 1,306,372 of Union Carbide Corporation discloses the utilization of a polyurethane foam as a carpet backing. The polyurethane foam is applied directly to the reverse side of the carpet or fabric. The prior art also includes the application of a film to a fabric, however the fabric must be napped and include a mechanical interlock between the film and fabric. The film is normally applied by transfer coating the cured film with an adhesive between the extending filaments of the fabric and the film layer. This laminate is therefore limited to fabrics having a napped surface to reduce fabric show through.

The prior art also includes polyurethane film and fabric or leather laminates, such as disclosed in U.S. Pat. No. 3,713,938 of Norwood Industries, Inc. The fabric or leather serves as the substrate or supporting layer and the polyurethane film serves as the superstrate or finish layer. The problem has been that the fabric or leather may "telescope" through the film in certain applications, such as laminates subject to repeated flexure. That is, the napped or irregular surface of the substrate shows through the relatively thin polyurethane film when the laminate is flexed or reformed in a shaped article, such as the upper of a shoe.

The improved plastic laminate of this invention eliminates many of the problems inherent in the laminates and methods of the prior art. The method of forming a plastic laminate of this invention may be utilized with relatively smooth, unnapped fabrics and the foam layer provides a resilient barrier between the superstrate or finish layer and the substrate layer, eliminating the problem of the fabric telescoping through the finish layer and improving the heft or loft of the laminate.

SUMMARY OF THE INVENTION

The improved plastic laminate of this invention includes three layers; (1) a relatively thin film of polyurethane formed as a substrate, preferably on a release surface, (2) a layer of polyurethane foam integrally bonded to the substrate, and (3) a sheet of fabric bonded to the foam layer and formed as a superstrate in the method of this invention. The fabric may be relatively smooth and unnapped, permitting the utilization of almost any fabric material, including woven and non-woven fabrics, felted materials, knits, monofilament fiberglass and the like.

The preferred polyurethane foam used in the plastic laminate of this invention has a density of less than 60 lb./ft.$^3$ and has greater than 120 cells per lineal inch, providing a foam material which is relatively micro porous, impervious to moisture and may be utilized in thicknesses of 0.005 to 0.250 inches. The finished laminate is particularly suitable for shoe uppers and the like which are subject to moisture, but must "breathe".

Further, the laminate may be formed under heat and pressure into a shaped article, such as a shoe upper or chair covering, wherein the thin polyurethane film or other plastic films serve as the exterior finish layer and the flexure stresses are transmitted and absorbed by the foam layer, permitting the film to move relative to the supporting fabric layer.

The method of this invention includes casting the polyurethane film as a substrate on a carrier or release surface, drying the polyurethane film, casting a layer of foamed polyurethane on the polyurethane film substrate, forming a substantially integral foam and substrate laminate, bonding a flexible sheet on the polyurethane foam layer, such as an unnapped fabric, and completing the curing of the polyurethane foam. The fabric may be bonded with adhesive to the polyurethane foam laminae by applying a suitable adhesive on the foam layer, which has been cured until tack-free, but not completely cured, and applying the fabric to the adhesive layer and subsequently curing the laminate. Alternatively, and preferably the fabric may be applied directly to the foam layer by partially curing the polyurethane foam and applying the fabric while the foam remains tacky. The foam is subsequently cured.

Other advantages and meritorious features of this invention will be understood from the following description of the preferred embodiments, the appended claims and the drawings, a description of which follows.

BRIEF DESCRIPTION OF THE DRAWINGS

FIG. 1 is a schematic illustration of the method of forming of the film and foam layers of the laminate of this invention;

FIG. 2 is a schematic illustration of one method of applying the fabric laminae of the laminate of this invention;

FIG. 3 is an enlarged, fragmentary perspective view of one embodiment of the laminate of this invention; and FIG. 4 is a side view of another embodiment of the laminate of this invention.

DESCRIPTION OF THE PREFERRED EMBODIMENTS AND METHOD OF THIS INVENTION

The embodiments of the improved laminate 68 and 70 of this invention and shown in FIGS. 3 and 4 may be formed by the method illustrated in FIGS. 1 and 2. In the disclosed method, the laminate is continuously cast upon conventional release paper 20 from roll 22. First, a quantity of fully reacted polyurethane 24 is metered on the release paper, as by knife 26. The roller 28 supports the paper, beneath the metering knife. The wet polyurethane film 30 is then dried by heating the film and evaporating the solvent. In the schematic illustration of FIG. 1, the film is passed through an over 32.

A quantity of polyurethane foam 34 is then cast upon the film and metered by knife 36, supported upon roller 38. The polyurethane foam is preferably substantially completely foamed prior to casting. The polyurethane foam 40 is then partially cured, as in oven 42 and stored on roller 44. The degree of curing of the polyurethane foam will depend upon the method of applying the fabric laminae, as described below.

It will be understood that the polyurethane film and foam laminae, 30 and 40 respectively, will thus become an integral, substantially continuous layer. In the preferred application, the polyurethane film laminae serves as a superstrate or finish layer, although it is cast as the substrate in the laminate and is referred to as the substrate in describing the method of this invention. As a shoe upper or chair covering material, for example, the polyurethane film and foam may include colorants to provide the desired color, such as imitation leather, or the release paper may include an embossed design, which is imparted to the polyurethane film.

The fabric may then be applied to the partially cured polyurethane laminate, as shown in FIG. 2. The polyurethane laminate is received from a roll 44 in FIG. 2 and adhesive 46 is applied to the foam laminae between metering knife 48 and roller 50, providing a metered film of adhesive 52. It will be understood that the adhesive and fabric may also be applied in a single, continuous line by feeding the polyurethane laminate directly from the oven 42 in FIG. 1.

In FIG. 2, the fabric 54 is fed from roll 58 between rollers 60 and 62, which compress the fabric laminae 64 against the adhesive layer. Finally, the polyurethane and adhesive laminae are cured in oven 66, resulting in laminate 68 shown in FIG. 3.

Where the fabric 54 is adhesively bonded to the polyurethane foam laminae 40, the polyurethane foam is preferably partially cured until it is tack-free. Alternatively, the fabric may be applied directly to the polyurethane foam laminae, preferably under pressure, in which case the polyurethane foam is partially cured in oven 42, but remains tacky and provides the "adhesive" bond between the foam and fabric laminae. It has been found that a polyurethane adhesive provides a substantially integral laminae 52 with the foam layer 40.

The laminate 68 shown in FIG. 3 includes the supporting release paper 20, which may be easily stripped from the laminate, a substrate laminae 30 of polyurethane film, an intermediate layer 40 of polyurethane foam which is substantially integral with the substrate layer 30, a layer 52 of adhesive, also preferably polyurethane and the superstrate laminae 64 of fabric. It is understood that the laminae has been separated in FIG. 3 for clarity of illustration only and the relative thickness of the laminae will depend upon the application.

Similarly, FIG. 4 illustrates another embodiment of the laminate of this invention, wherein the fabric is applied directly to the foam laminae without an adhesive. The laminate 70 includes a releasable support paper 72, a polyurethane film 74 which forms the superstrate in the finished product, an intermediate layer of polyurethane foam 76 and a fabric layer 78. As described above, the foam laminae 76 is only partially cured and remains tacky to the touch. The fabric 78 is then applied under pressure, as shown in FIG. 2, to the tacky surface of the foam. Finally, the foam is cured in oven 66, forming an excellent bond between the fabric and foam. It is understood that in this method, the process is preferably continuous, avoiding handling of the partially cured foam.

The thickness of the laminae will depend upon the particular application, however the laminate formed by the method of this invention may be very thin by conventional standards and still have excellent flexibility, structural strength and wear resistance. The polyurethane film 30 or 74 may have a thickness of 0.5 to 5 mils dry, preferably between about 1.5 to 3 mils dry. The polyurethane foam may have a thickness of about 5 to 250 mils dry, preferably about 5 to 45 mils. It will be understood that the high density polyurethane foam described herein can be utilized in this range of thicknesses without loss of structural integrity. The less dense foams described in the prior art cannot be. The adhesive may be applied in a wet thickness of about 2 to 12 mils, which results in a dry thickness of about 0.5 to 3 mils and 0.5 to 1.5 mils has been found suitable for the polyurethane adhesives described below. The thickness of the fabric will depend upon the type of fabric used. For example, in one embodiment, a nonwoven felted sheet was tested having an initial thickness of approximately 1 inch. Prior to bonding, the sheet was compressed by conventional methods to about 45 mils, which provided an excellent substrate for the finished product.

The polyurethane film utilized in the laminate of this invention is preferably a fully reacted light and hydrolytically stable polyurethane which is cast in a liquid state on the release paper and dried. Suitable polyurethanes for the laminate of this invention are sold by Wilmington Chemical Company under the tradename "HELASTIC", such as Helastic 13107, 13160, etc. The solvent may be DMF, aromatics, alcohols, esters, ketones, toluenes, etc. and/or combinations thereof.

As is well-known, polyurethanes are ordinarily formed from organic isocyanates and hydrogen bearing compounds which may include linear or branched-chain polyesters, polyethers or the like. Suitable polyurethane compounds are described in the U.S. Pat. of Norwood Industries, Inc., No. 3,713,938.

As described above, the polyurethane foam is preferably cast upon the polyurethane film after complete drying. The polyurethane foam is preferably substantially completely foamed prior to casting. The polyurethane foam utilized herein has a density of about 65 pounds per cubic foot prior to foaming and greater than 33 pounds per cubic foot after foaming. The preferred polyurethane foam has a density of less than 60, to about 30 pounds/ft.$^3$ and the cells are very fine, preferably greater than 120 cells/linear inch. Commercial polyurethane foams generally have a density of less than 6 pounds/ft.$^3$. In the preferred foam, there is little or no capilary action through the foam, which is particularly important in shoe uppers for example, making the foam relatively impervious to moisture. The preferred foam will however "breathe" because it is relatively micro porous. The polyurethane may be foamed by conventional methods, as by foaming agents, or the polyurethane may be foamed by mechanical means. Suitable polyurethane foam compositions are described in the above referenced British patent of Union Carbide Corporation.

It will be understood that any suitable adhesive may be used in the improved laminate of this invention, however the preferred embodiment of the laminate uses a polyurethane adhesive, preferably a two-component system.

As described above, the laminate of this invention may utilize a wide range of fabric materials which could not be utilized in the polyurethane-fabric laminates described in the prior art. The laminate may include a fabric which is not "applicable" with the polyurethane film because the fabric is spaced from the film by the polyurethane foam. The fabric material may therefore be unnapped, including woven and non-woven fabrics, felted materials as described above, fiberglass mats, knits, etc. The laminate may therefore be made with almost any substrate or fabric. The resultant laminate has an increased "heft" or loft and has better strength characteristics. Further, and most importantly, the integral polyurethane laminate provides unexpected improvements in strength and wear resistance. Delamination was tested on a Taber Abrasion Machine, H-22 wheel, per 1000 gm weights, which continuously abrades the laminate to determine how many cycles are required to cause delamination. For example, delamination normally occurs in polyurethane film-fabric laminates after approximately 100 cycles, however the three-layer laminate of this invention does not normally delaminate after 500 cycles, providing a 5 to 1 improvement in the bond strength. This was not expected from the known prior art.

The laminate of this invention may also be formed under heat and pressure into a shaped article having concave exterior surfaces because of the integral polyurethane laminae and the improved strength characteristics provided by the polyurethane foam laminae. The stresses in the polyurethane film, which is the superstrate in the shaped article, are transmitted and absorbed by the foam layer and the finish film is permitted to move laterally relative to the fabric substrate. Further, the fabric does not "telegraph" through the relatively thin polyurethane film, as described above.

The following examples illustrate the polyurethane foam laminate of this invention. In each of the following examples, the thickness expressed is the dry thickness, after evaporation of any carrier or solvent which may be present. The polyurethane film substrate in the following examples may have a composition similar to the polyurethane film disclosed in U.S. Pat. No. 3,713,938 and the polyurethane foam may be similar to the polyurethane foam compositions disclosed in the above referenced British patent of Union Carbide Corporation.

EXAMPLE 1

A polyurethane film having a thickness of 0.5 mils was cast as a substrate on a continuous sheet of conventional release paper. The film was then dried at 300° F. for two minutes. A polyurethane foam having a density of 34 pounds per cubic foot was then cast directly on the polyurethane film. The thickness of the polyurethane foam was 30 mils. The foam was then partially cured in a conventional oven at 150° F. for four minutes. The polyurethane foam laminae remained tacky, prior to application of the fabric. A sheet of densified needle punched non-woven rayon-nylon was then applied over the foam laminae and pressure applied as shown in FIG. 2 of the drawings. The laminate was then cured in a conventional oven at 350° F. for three minutes. The process was completly continuous and an excellent laminate was formed between the film, foam and fabric.

EXAMPLE 2

A polyurethane film having a thickness of 1.2 mils was cast upon a continuous sheet of release paper and dried at 225° F. for four minutes. A polyurethane foam was cast upon the polyurethane film having a density of 40 pounds per cubic foot. The thickness of the polyurethane foam was 20 mils. The laminate was then heated to 175° F. for three minutes, partially curing the foam, which remained tacky to the touch. A sheet of unnapped sateen was then applied to the tacky surface of the foam and pressure applied, as described above. The laminate was then heated to 275° F. for four minutes, resulting in an excellent laminate between the film, foam and substrate.

EXAMPLE 3

A polyurethane film having a thickness of 5 mils was cast upon a release surface and heated to 300° F. for four minutes. A polyurethane foam having a density of 55 pounds per cubic foot and a thickness of 5 mils was then cast upon the polyurethane film and the laminate was heated to 275° F. for 45 seconds. The surface of the foam laminae remained tacky to the touch. A sheet of standard napped sateen, 100% cotton, was then applied under pressure to the tacky surface of the foam laminae and the laminate was heated to 350° F. for three minutes. Again, an excellent laminate was formed.

EXAMPLE 4

A polyurethane film was continuously cast upon a sheet of release paper having a thickness of 0.75 mils and the film was dried at 250° F. for three minutes. A foam having a density of 55 pounds per cubic foot and a thickness of 15 mils was then continuously cast upon the polyurethane film and the laminate was heated to 350° F. for three minutes. The polyurethane foam layer was dry and smooth to the touch. A 3 mil thickness of polyurethane adhesive, such as described in the specification above, was then cast upon the polyurethane foam and a napped knit nylon was applied continuously, under pressure to the adhesive face of the foam laminae. Finally, the laminate was heated to 250° F. for four minutes resulting in an excellent laminate.

EXAMPLE 5

A polyurethane film having a thickness of 1.2 mils was cast upon a release paper and heated to 225° F. for four minutes. A polyurethane foam having a density of 50 pounds per cubic foot and a thickness of 20 mils was then cast upon the polyurethane film and heated to 350° F. for four minutes. The polyurethane foam was dry and smooth to the touch. A polyurethane adhesive having a thickness of 2 mils was then cast upon the polyurethane foam and a sheet of unnapped sateen was applied under pressure to the adhesive coated face of the polyurethane foam and the laminate was heated to 275° F. for four minutes.

EXAMPLE 6

A polyurethane film having a thickness of 5 mils was continuously cast upon a sheet of release paper and heated to 250° F. for three minutes. A polyurethane foam having a density of 40 pounds per cubic foot was then continuously cast upon the polyurethane film layer having a thickness of 25 mils and the laminate was heated to 275° F. for four minutes, resulting in a dry, smooth surface. A polyurethane adhesive having a thickness of 4 mils was then cast upon the exposed surface of the polyurethane foam and a sheet of unnapped knit nylon was then continuously applied, under pressure, to the adhesive coated face of the polyurethane foam. Finally, the laminate was heated to 225° F. for five minutes.

EXAMPLE 7

A two package polyurethane film having 100% solids and a composition as disclosed in the above referenced British patent of Union Carbide Corporation was cast, without foaming, on a continuous sheet of release paper. The polyurethane film was then heated to 325° F. for three minutes. A polyurethane foam having a density of 36 pounds per cubic foot and a thickness of 20 mils was then cast upon the polyurethane film and heated to 300° F. for three and one-half minutes. The polyurethane foam was dry and smooth to the touch. A two package polyurethane having 100% solids, as described above, was then cast, without foaming, upon the polyurethane foam layer, as an adhesive. The thickness of the adhesive was 2.5 mils. The laminate was then heated to 225° F. for three minutes. The adhesive layer remained tacky to the touch. An unnapped sateen fabric was then applied, under pressure, to the adhesive coated polyurethane foam layer and the laminate was finally heated to 300° F. for three minutes.

In Examples 1 to 3 above, a sheet of fabric was bonded directly to the foam as a superstrate, without an adhesive. As described, this was accomplished by semicuring or partially curing the foam laminae and applying the superstrate over the tacky surface of the foam under pressure. It is important to note that an excellent bond is thus provided even with unnapped fabrics, which is not possible with the laminates and methods disclosed in the prior art. In Examples 3 to 6, a polyurethane adhesive was applied between the foam laminae and the fabric superstrate, again permitting the use of unnapped fabrics. Example 7 is actually a combination of these two methods, wherein a two package polyurethane film is applied to the foam laminae and partially cured and the fabric is applied under pressure to the film.

Having fully described the laminate and method of this invention, we now claim:

1. A method of making a laminate, comprising the steps of:
   a. casting a layer of substantially fully reacted polyurethane as a substrate on a carrier treated with a release agent,
   b. drying of said polyurethane substrate layer,
   c. casting a layer of substantially completely foamed polyurethane on said polyurethane substrate,
   d. heating said laminate to at least partially curing said polyurethane foam layer,
   e. bonding a flexible sheet over said polyurethane foam layer,
   and
   f. completely curing the polyurethane layer.

2. The method defined in claim 1, wherein said polyurethane foam layer is cured until tack-free, and said flexible sheet is bonded to said foam layer by applying an adhesive to the interface between said foam layer and flexible sheet.

3. The method defined in claim 1, wherein said polyurethane foam layer is partially cured, but remains tacky and said flexible sheet is applied under pressure directly to said foam layer.

4. The method defined in claim 1, wherein said polyurethane is substantially completely foamed prior to application to said unfoamed polyurethane substrate, said foamed layer having a density of about thirty-three to fifty pounds per cubic foot and greater than 120 cells per linear inch.

5. The method defined in claim 1, wherein said flexible sheet is a sheet of fabric, including bonding an unnapped face of a fabric sheet to said polyurethane foam layer by applying a polyurethane adhesive to said polyurethane foam when said foam is tack-free, but not completely cured.

6. The method defined in claim 1, including the additional steps of:
   a. removing the plastic laminate from the treated surface; and
   b. heating and forming under pressure a shaped article having concave surfaces with said fabric layer forming a supporting substrate and the finish layer forming the exterior finish layer.

* * * * *